United States Patent [19]

Hayashi

[11] Patent Number: 5,014,889
[45] Date of Patent: * May 14, 1991

[54] POWDER FEEDING APPARATUS

[75] Inventor: Tsunemi Hayashi, Shizuoka, Japan

[73] Assignees: Akatake Engineering Co., Ltd., Numazu; Shin-Etsu Chemical Co., Ltd., Tokyo, both of Japan

[*] Notice: The portion of the term of this patent subsequent to Jul. 3, 2007 has been disclaimed.

[21] Appl. No.: 412,595

[22] Filed: Sep. 26, 1989

Related U.S. Application Data

[63] Continuation of Ser. No. 132,238, Dec. 14, 1987, abandoned.

[30] Foreign Application Priority Data

Dec. 24, 1986 [JP] Japan ................................ 61-306569

[51] Int. Cl.$^5$ ......................... B67D 5/08; G01G 13/18
[52] U.S. Cl. ..................................... 222/644; 222/77; 222/199; 222/236; 222/410
[58] Field of Search ........................................ 222/642

[56] References Cited

U.S. PATENT DOCUMENTS

| 1,135,313 | 4/1915 | Moore | 222/199 |
|---|---|---|---|
| 1,796,480 | 3/1931 | Schellentrager | 177/62 |
| 2,241,509 | 5/1941 | Graves | 222/199 |
| 2,611,465 | 9/1952 | Simon | 193/53 |
| 2,638,248 | 5/1953 | Alvord | 222/56 |
| 2,696,285 | 12/1954 | Zenlea | 221/200 |
| 3,003,667 | 10/1961 | Jonsson | 222/199 |
| 3,498,395 | 3/1970 | Henry | 222/56 |
| 3,985,266 | 10/1976 | Wright, Jr. | 222/77 |
| 4,266,691 | 5/1981 | Wolwowicz | 222/56 |
| 4,359,176 | 11/1982 | Johnson | 222/504 |
| 4,437,595 | 3/1984 | Stevens, et al. | 222/644 |
| 4,702,674 | 10/1987 | Fontaine et al. | 222/642 |

FOREIGN PATENT DOCUMENTS

| 738317 | 7/1943 | Fed. Rep. of Germany . | |
|---|---|---|---|
| 1489157 | 6/1966 | France | 222/236 |
| 6066120 | 4/1985 | Japan | 222/425 |
| 2034922 | 6/1980 | United Kingdom | 222/644 |

Primary Examiner—Robert P. Olszewski
Assistant Examiner—Steven Reiss
Attorney, Agent, or Firm—Beveridge, DeGrandi & Weilacher

[57] ABSTRACT

A powder feeding apparatus comprising a holding hopper for holding a powder, a metering hopper for metering the powder from the holding hopper, a mechanism for opening and closing a discharge opening in the metering hopper, a controller for controlling the hopper opening-closing mechanism, and a trough where the powder discharged in a heap from the metering hopper is smoothed into a layer.

6 Claims, 4 Drawing Sheets

POWDER FEEDING APPARATUS

This application is a continuation of application Ser. No. 07/132,238, filed Dec. 14, 1987, and now abandoned.

FIELD OF THE INVENTION

This invention relates to a powder feeding apparatus.

DESCRIPTION OF THE PRIOR ART

A so-called batchwise powder metering and feeding apparatus has been proposed and in use which comprises a holding hopper for holding a powder, a metering hopper for metering the powder and hopper opening and closing means for opening and closing a discharge opening provided in the metering hopper. This batchwise powder feeding apparatus is characterized typically by (a) having a high metering accuracy because the metering hopper can be built in light weight, (b) permitting metering irrespective of subsequent steps, and (c) being capable of discharging the metered powder within a short time.

Since, however, this apparatus is of such a structure that the powder is metered in the metering hopper and then discharged, it is fundamentally unsuitable for continuous feeding, and has only limited use in spite of the above characteristics.

SUMMARY OF THE INVENTION

It is a primary object of this invention to provide an improved metering feeding apparatus which can be applied to continuous feeding of a powder while retaining the characteristics of the batchwise metering.

Another object of this invention is to provide an improved powder feeding apparatus which permits adjustment of the amount of a powder fed to a desired value.

According to this invention, there is provided a powder feeding apparatus comprising a holding hopper for holding a powder, a metering hopper for metering the powder fed from the holding hopper, hopper opening-closing means adapted to be selectively held at an opening position at which it opens a discharge opening in the metering hopper and a closing position at which it closes the discharges opening, control means for controlling the hopper opening-closing means, and smoothening means for smoothening the powder discharged from the metering hopper.

DETAILED DESCRIPTION OF PREFERRED EMBODIMENTS

One specific embodiment of the powder feeding apparatus constructed in accordance with this invention will be described in detail with reference to the accompanying drawings.

Figure 1:
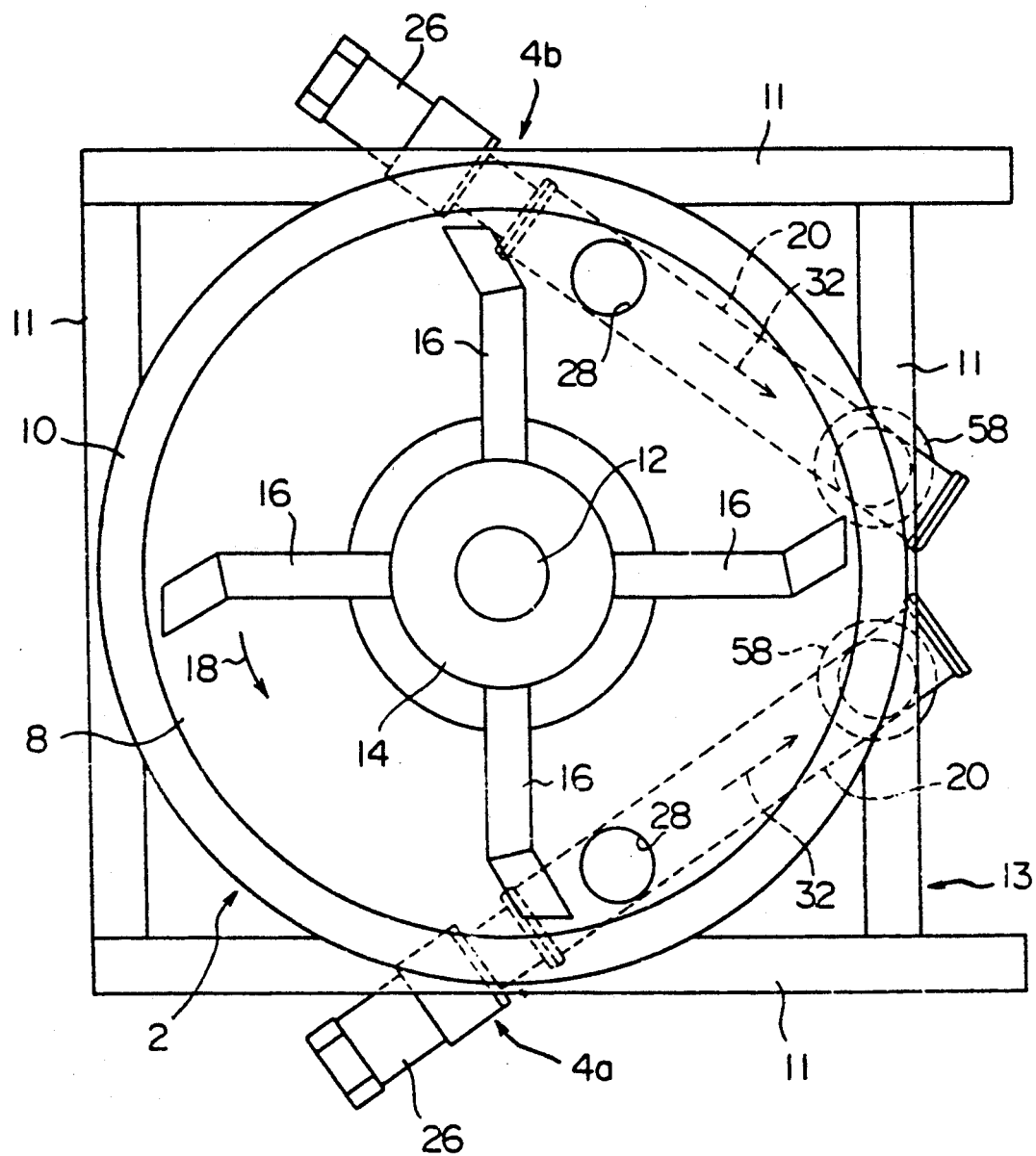
FIG. 1 is a top plan view showing the essential parts of one embodiment of the powder feeding apparatus constructed in accordance with this invention.
Figure 2:
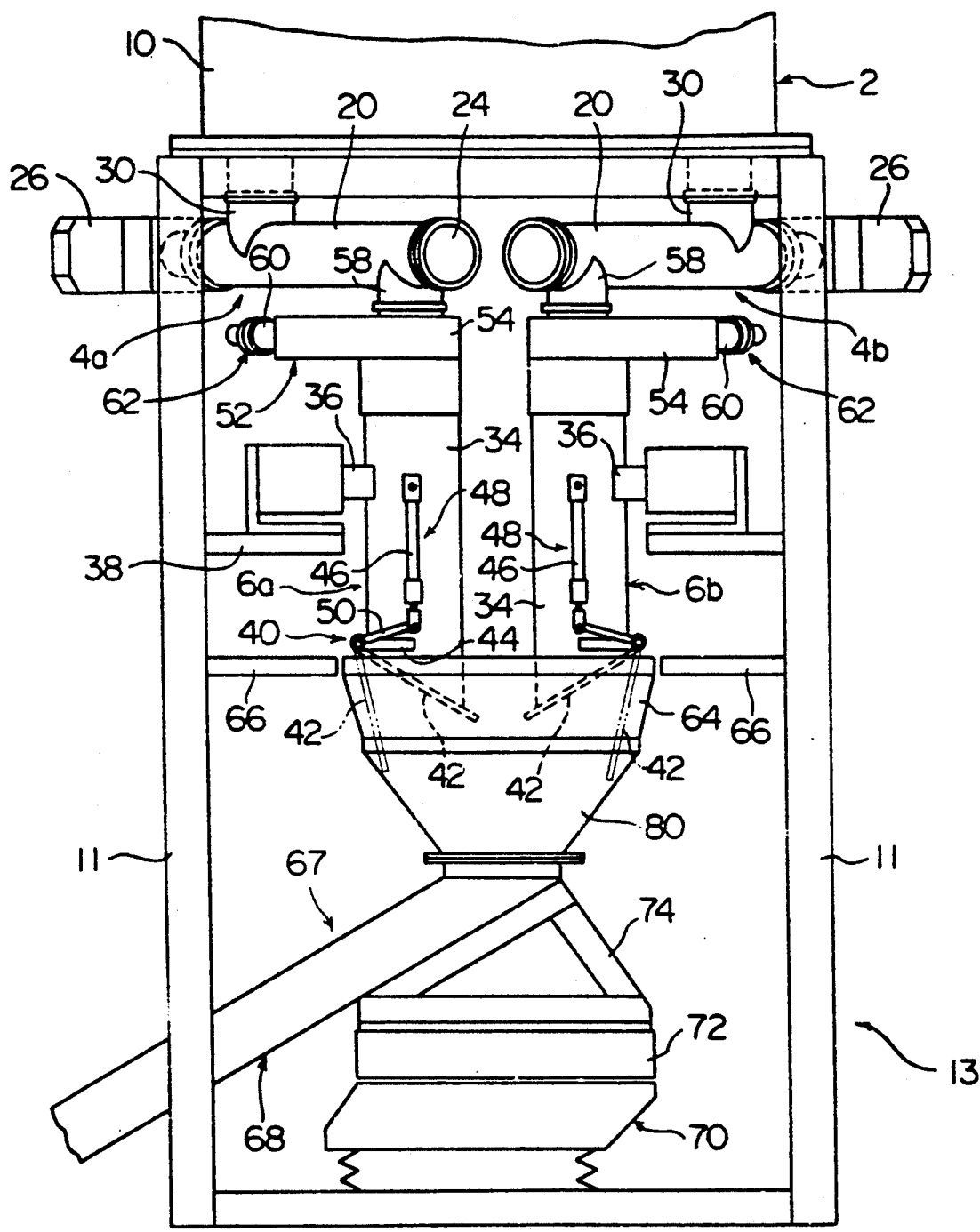
FIG. 2 is a front view of the powder feeding apparatus shown in FIG. 1.

With reference to FIGS. 1 and 2, the illustrated powder feeding apparatus includes a holding hopper 2, transfer means 4a and 4b and metering hoppers 6a and 6b. The illustrated holding hopper 2 has a circular bottom wall 8 and a cylindrical side wall 10 extending upwardly from the circumferential side edge of the bottom wall 8, and receives a powder to be fed (for example, fine powdery carbon). A rotating shaft 12 is rotatably mounted on the bottom wall 8 of the holding hopper 2, and a plurality of (4 in the specific embodiment) agitation members 16 are mounted on the rotating shaft 12 via a fixing sleeve 14. Each agitation member 16 extends from its one end portion mounted on the fixing sleeve 14 radially outwardly to near the inside surface of the side wall 10, and prevents blocking of the powder in the holding hopper 10 by turning in the direction shown by an arrow 18. The holding hopper 2 is mounted on the upper end portion of a frame structure 13 constructed by properly linking various frames 11.

The transfer means 4a and 4b are of substantially the same structure, and so are the metering hoppers 6a and 6b. Hence, only one of them in each will be described. The transfer means 4a (4b) in the illustrated embodiments includes a hollow cylindrical member 20 disposed substantially horizontally below the holding hopper 2 and a helical member 22 (FIG. 5) disposed in the hollow cylindrical member 20. Both ends of the hollow cylindrical member 20 are closed, and the helical member 22 is rotatably mounted between two end walls 24 (only one of which is shown in FIG. 2). One end wall 24 of the hollow cylindrical member 20 further has a driving source such as an electric motor mounted thereon, and the driving source 26 is drivingly connected to the helical member 22. An opening is formed in the upper part of one end portion of the hollow cylindrical member 20. An opening 28 (FIG. 1) is formed in the bottom wall 8 of the holding hopper 2. These openings are connected by a hollow connector 30. An opening is also formed in the lower part of the other end portion of the hollow cylindrical member 20 (see FIG. 5 also). Hence, when the helical member 22 is rotated in a predetermined direction by the action of the driving source 26, a powder fed into one end portion of the hollow cylindrical member 20 through the opening 29 formed in the bottom wall 8 of the holding hopper 2 is transferred in the direction shown by an arrow 32 (FIG. 1), and fed into the metering hopper 6a (6b) through the opening formed in the other end portion as will be described hereinbelow.

The metering hopper 6a (6b) is disposed below the other end portion of the hollow cylindrical member 20. The illustrated metering hopper 6a (6b) is comprised of a cylindrical hopper 34, and mounted via weight detecting means which can be formed of a load cell 36 on a supporting member 38 fixed to the frame structure 13. .An introduction opening is defined in the upper end of the hopper 34 and a discharge opening is defined in its lower end. Hopper opening-closing means 40 is disposed in the discharge opening of the hopper 34. The hopper opening-closing means 40 has a plate-like opening-closing member 42 which is mounted openably and closably mounted via a shaft member on a supporting portion 44 provided in the hopper 34. The opening-closing member 42 is provided with opening-closing actuation means 48 which can be constructed of, for example, a pneumatic cylinder mechanism 46. The output portion of the opening-closing actuation means 48 is connected to the opening-closing member 42 via an arm member 50. Accordingly, when the opening-closing actuation means 48 is in the deenergized state (when the pneumatic cylinder mechanism 46 is contracted), the opening-closing member 42 is held at a closing position shown by a broken line in FIG. 2 and a solid line in FIG. 5. Thus, the opening-closing member 42 closes the discharge opening of the hopper and the powder in the hopper 34 is not discharged. On the other hand, when the opening-closing actuation means 48 is energized (when the pneumatic cylinder mechanism 46 is stretched), the opening-closing member 42 is held at an opening position shown by a two-dot chain line in FIGS. 2 and 5, and opens the discharge opening of the hopper 34. Consequently, the powder in the hopper 34 is discharged through the discharge opening.

In the illustrated embodiment, shutter means 52 is disposed between the hollow cylindrical member 20 and the hopper 34. The shutter means 52 includes a fixing member 54 and a shutter member 56 (FIG. 5) mounted on the fixing member 54. In the illustrated embodiment, a hollow cylindrical member 58 communicating with the above-mentioned opening is also connected to the other end portion of the hollow cylindrical member 20 of the transfer means 4a (4b), and the fixing member 54 of the shutter means 52 is mounted on the lower end of the hollow cylindrical member 58. In the fixing member 54 is formed a through opening communicating with the opening formed in the other end portion of the hollow cylindrical member 20 and the introduction opening of the hopper 34. A shutter member 56 is movably mounted (see FIG. 5) so as to open or close the through opening. Shutter actuating means 62 that can be constructed of, for example, a pneumatic cylinder mechanism 60 is disposed and the shutter member 56 is directly mounted on the output portion of the shutter actuating means 62. When the shutter actuating means 62 is in the deenergized state (namely when the pneumatic cylinder mechanism 60 is contracted), the shutter member 56 is held at an opening position (not shown) at which it opens the through opening of the fixing member 54 to permit the powder from the transfer means 4a (4b) to be fed to the hopper 34 through the introduction opening. On the other hand, when the shutter actuating means 62 is energized (namely when the pneumatic cylinder mechanism 60 is stretched), the shutter member 56 is brought to a closing position (the position shown in FIG. 5) at which it closes the through opening of the fixing member 54 to stop feeding of the powder from the transfer means 4a (4b) to the hopper 34.

Figure 3:
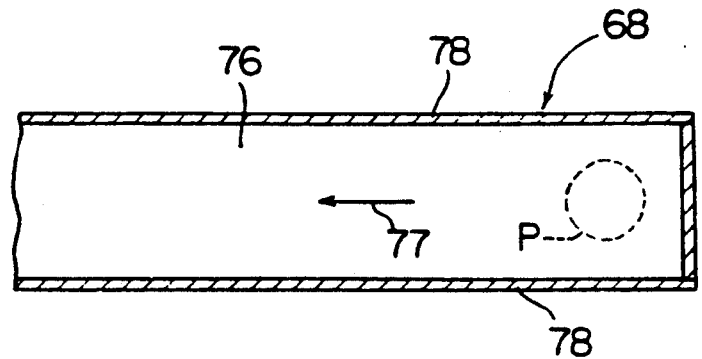
FIG. 3 is a cross-sectional view showing a trough in the powder feeding apparatus shown in FIG. 1.
Figure 4:
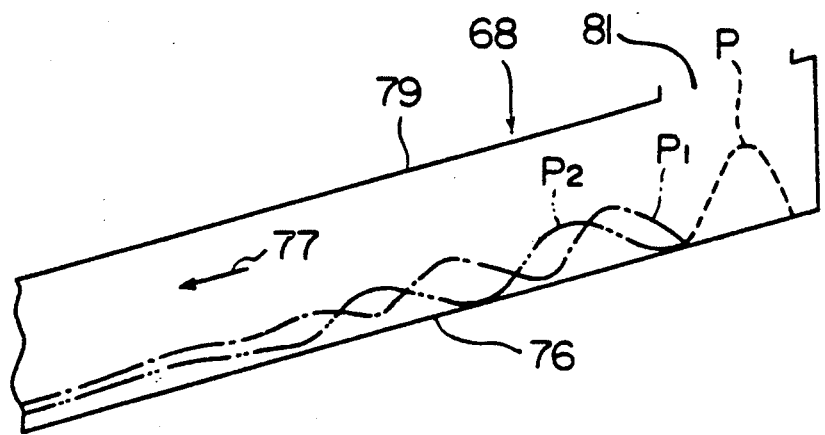
FIG. 4 is a simplified explanatory view for illustrating the state of a powder discharged from a metering hopper in the powder feeding apparatus shown in FIG. 1.

Below the metering hoppers 6a and 6b is disposed a collecting member 64 of a funnel shape having a progressively smaller cross-section as it extends downwardly. The collecting member 64 is supported on a supporting member 66 of the frame structure 13 via a linking member (not shown). Smoothening means 67 for smoothening the powder is further disposed below the collecting member 64. The illustrated smoothening means 67 is provide with a trough 68 and a vibration generator 70. A fixing frame structure 74 is secured to the vibration output portion 72 of the vibration generator 70, and one end portion of the trough 68 is attached to the fixing frame structure 74. With reference to FIGS. 3 and 4, the trough 68 has an elongated bottom wall 76, both side walls 78 extending upwardly from both side ends of the bottom wall 76 and an upper wall 79, and is inclined downwardly in the transfer direction of the powder shown by an arrow 77 (see FIG. 2 also). An opening 81 is formed in one end portion of the upper wall 79 of the trough 68, the opening 81 and the opening at the lower end of the collecting member 64 are connected to each other by means of a stretchable member 80 (FIG. 2) such as a flexible joint. Because of the foregoing structure, the powder discharged from the metering hoppers 6a and 6b is discharged into the trough 68 via the collecting member 64 and the stretchable member 80 as shown by a broken line P in FIGS. 3 and 4, and is smoothened as will be stated hereinbelow by vibrations generated by the vibration generator 70. It is then conveyed downstream in the transfer direction shown by arrow 77.

Now, with reference mainly to FIG. 5, the control system of the powder feeding apparatus will be described. The illustrated powder feeding apparatus further includes control means 82 for controlling the various constituent elements. The control means 82 may be comprised of, for example, a microprocessor, and includes timer means 84 for measuring the time and time setting means 86 for setting the elapsed time in the timer means 84. Hence, by operating the time setting means 86, the elapsed time of the timer means 84 can be set at a desired value. When the preset time of the timer means 84 is up, the control means 82 produces a discharge signal which is then fed to the hopper opening-closing means 48 provided in the metering hoppers 6a and 6b. In the specific embodiment, a detection signal from the load cell 36 of the metering hopper 6a and 6b is fed into the control means 82. Various actuation signals produced in the control means 82 are fed into the driving source 26 for the transfer means 4a and 4b, the shutter actuating means 62 of the shutter means 52 and the vibration generator 70.

Figure 5:
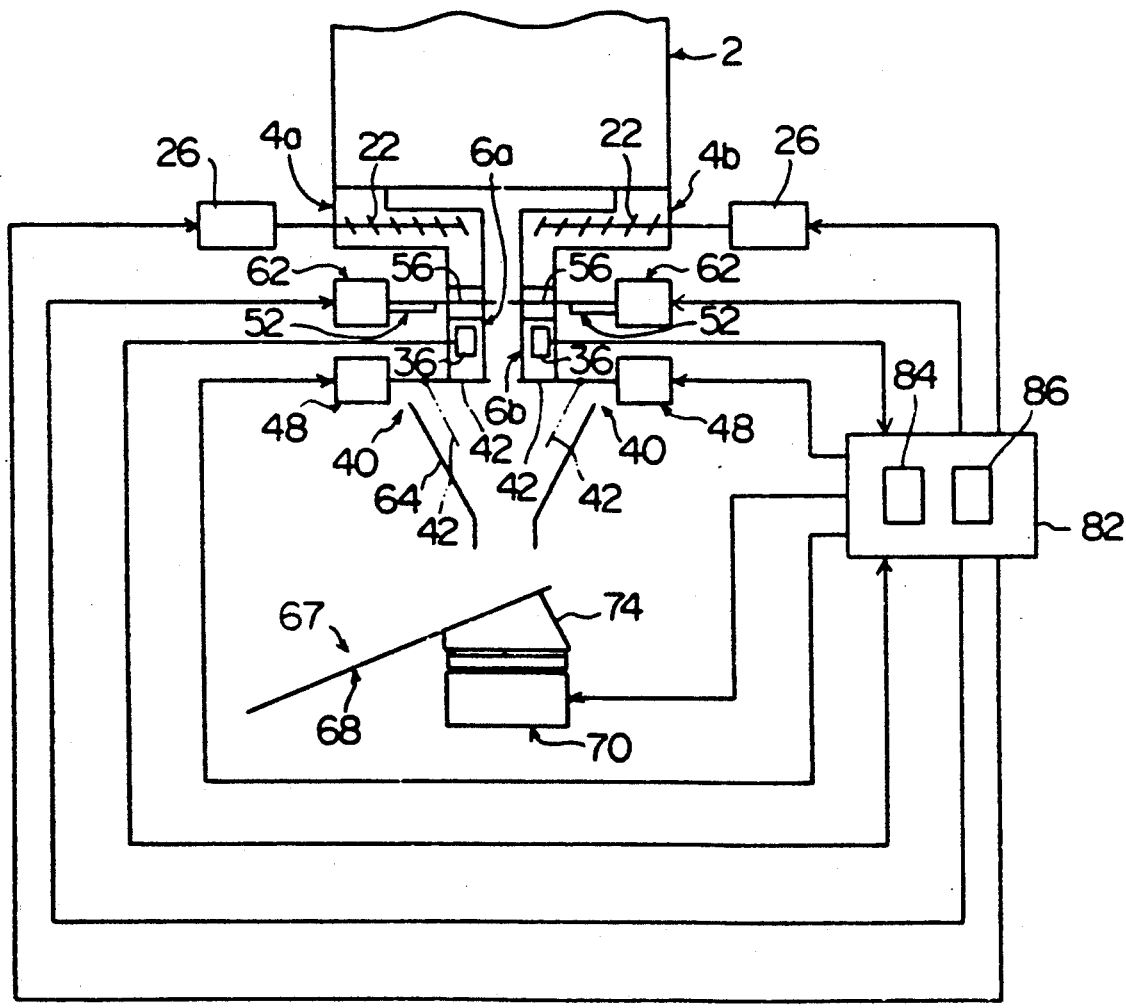
FIG. 5 is a simplified view of a control system in the powder feeding apparatus shown in FIG. 1.

With reference to FIG. 5, the controlling operation of the control means 82 will be described.

To feed the powder, the control means 82 first energizes the driving source 26 for the transfer means 4a (4b) and the vibration generator 70 (at this time, the agitation member 16 is rotated in the direction of arrow 18 in FIG. 1). When the driving source 26 is energized, the helical member 22 is rotated in a predetermined direction, and the powder in the holdng hopper 2 is fed to the metering hopper 6a (6b) by the action of the helical member 22 of the transfer means 4a (4b). Energization of the vibration generator 70 results in application of vibrations to the trough 68.

When the powder is thus fed into the hopper 34 of the metering hopper 6a (6b) to a predetermined weight, the signal from the load cell 36 provided in the hopper 34 causes the control means 82 to deenergize the driving source 26 for the transfer means 4a (4b) and to energize the shutter actuating means 62 of the shutter means 52. When the driving source 26 is deenergized, the rotation of the helical member 22 is stopped to stop the feeding of the powder from the holding hopper 2. Upon energization of the shutter actuating means 62, the shutter member 56 is held at the closing position to hamper accurately the introduction of the powder into the hopper 34 through the introduction opening.

When the preset time of the timer means 84 is up (the timer means 84 starts measuring the time at the beginning of feeding the powder, and when the preset time is up, it returns to the starting point and measures the preset time again, and repeats this time measuring), the control means 82 produces a discharge signal which is fed into the opening-closing actuation means 49 of the opening-closing means 40 disposed in the metering hopper 6a (6b). As a result, the opening-closing actuation means 48 is energized and the opening-closing member 42 is held at the opening position. Consequently, the powder metered in the metering hopper 6a (6b) is discharged through the discharge opening, and further discharged into one end portion of the trough 68 as shown by the broken line P in FIG. 3 through the collecting member 64 and the member 80. Since vibrations are applied to the trough 68 by the action of the vibration generator 70, the discharged powder is transferred by the vibrations in the direction shown by arrow 77 (FIGS. 3 and 4) and fully smoothened during this transfer. Thus, the powder is transferred downsteam substantially continuously. When a predetermined period of time (the time required for the powder in the metering hopper 6a (6b) to be discharged from the discharge opening) elapses from the energization of the opening-closing actuation means 48, the driving source 26 of the transfer means 4a (4b) is energized and the shutter actuating means 62 of the shutter means 52 and the opening-closing means 48 are deenergized. Consequently, feeding of the powder from the holding hopper 2 to the metering hopper 6a (6b) is resumed. In the illustrated embodiment, discharging of the powder from the metering hopper 6a and the discharging of the powder from the metering hopper 6b are alternately carried out.

In the above specific embodiment, the amount of the powder to be fed to the trough 68 is adjusted by varying the elapsed time set by the time setting means 86 in the timer means 84. Specifically, when, for example, the elapsed time in the timer means 84 is set at a relatively short period, the intervals of discharging of the powder from the metering hopper 6a (6b) becomes short. Thus, the powder discharged in a heap into the trough 68 as shown by the broken line is smoothened in layer as shown by a one-dot chain line $P_1$ as it is transferred in the direction of arrow 77. It is fed downstream as a relatively thick substantially uniform continuous layer, and the amount of the powder fed from the trough 68 becomes large. On the other hand, when the elapsed time in the timer means 84 is set at a relatively long period by the time setting means 86, the interval of discharging of the powder from the metering hopper 6a (6b) becomes long. Thus, the powder discharged in a heap as shown by the broken line into the trough 68 is smoothened as shown by a two-dot chain line $P_2$ in FIG. 4 as it is transferred in the direction shown by arrow 77. The powder is fed downstream as a relatively thin substantially uniform continuous layer, and the amount of the powder fed from the trough 68 becomes small.

The amount of the powder fed from the trough 68 can also be adjusted by varying both the elapsing time in the timer means 84 and the weight of the powder metered in the metering hopper 6a (6b). This enables the amount of feed to be adjusted to the desired one over a broad range.

Figure 6:
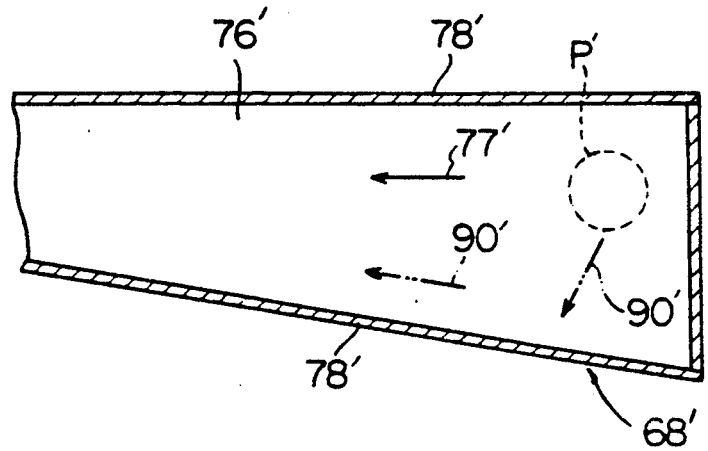
FIG. 6 is a cross-sectional view showing a first modified example of the trough.

To perform the powder smoothening action in the trough effectively, the trough is preferably constructed as shown in FIG. 6. In FIG. 6, the trough 68' has a bottom wall 76' and two side walls 78' extending upwardly from both side ends of the bottom wall 76'. One side wall 78' (the upper one in FIG. 6) extends substantially parallel to the direction of transferring the powder as shown by an arrow 77', and the other side wall 78' (the lower one in FIG. 6) extends toward the downstream side of the transferring direction shown by arrow 77' while being inclined inwardly. The width of the trough 68' decreases progressively toward the downstream side of the transferring direction of arrow 77'. Owing to the above structure of the trough 68', the powder discharged as shown by a broken line P' is partly conveyed, downstream in the transfering direction of arrow 77'. As shown by the two arrows 90' in two-dot claim lines, the powder is partly spread toward the other side wall 78' and transferred downstream along the other side wall 78'. As a result, the flowing of the powder is complicated and its smoothening is promoted.

Figure 7:
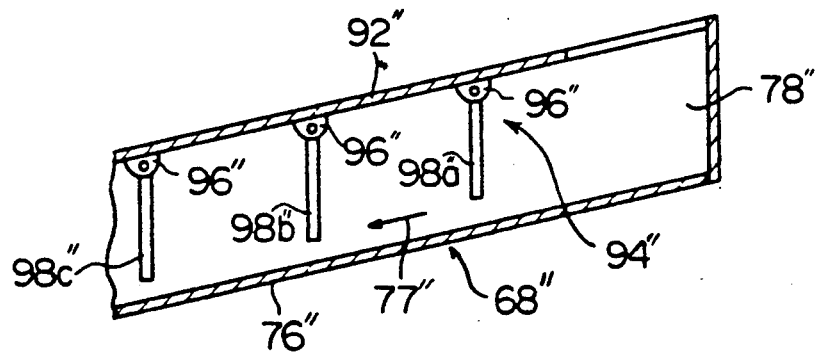
FIG. 7 is a cross-sectional view of a second modified example of the trough.

To make the powder smoothening action in the trough more accurate and effective, the trough is preferably constructed as shown in FIG. 7. In FIG. 7, the illustrated trough 68" has a bottom wall 76", two side walls 78" (only one of which is shown) and an upper wall 92", and forced smoothening means 94" is provided in relation to the upper wall 92". The illustrated forced smoothening means 94" is comprised of a plurality of smoothening members 98"a, 98"b and 98"c disposed pivotally in spaced-apart relationship in the transferring direction of the powder shown by arrow 77". Each of the smoothening members 98"a, 98"b and 98"c is pivotally mounted via a shaft on a supporting projection 96" fixed to the inside surface of the upper wall 92". The smoothening members 98"a, 98"b and 98"c are each constructed of a plate-like member and extend between the two side walls 78" of the trough 68". As shown in FIG. 7, it is preferred to construct these smoothening members such that they approach the inside surface of the bottom wall 76" of the trough 68" to a greater degree as they extend more toward the downstream side of the transferring direction shown by arrow 77".

In the trough 68" provided with the above forced smoothening means 94", application of vibrations by the vibration generator 70 (FIG. 2) causes each of the smoothening members 98"a, 98"b and 98"c to oscillate with its upper end portion as a fulcrum. Thus, the smoothening members 98"a, 98"b and 98"c act on the powder flowing over the bottom wall 76" to smoothen the powder in a layer. Smoothening of the powder is therefore achieved accurately and effectively.

While the present invention has been described in accordance with one specific embodiment of the powder feeding apparatus constructed in accordance with this invention, it should be understood that the invention is not limited to this specific embodiment, and various changes and modifications may be made without departing from the scope of the invention described and claimed herein.

For example, although in the specific embodiment, the present invention has been described with regard to the case of having two metering hoppers, it can equally be applied to the case of having one metering hopper or three or more hoppers.

What is claimed is:

1. A powder feeding apparatus comprising a holding hopper for holding a powder, a metering hopper for metering the powder fed from the holding hopper, hopper opening-closing means adapted to be selectively held at an opening position at which it opens a discharge opening in the metering hopper and a closing position at which it closes the discharge opening, control means for controlling the hopper opening-closing means so as to discharge the powder in intervals, and smoothening means for substantially smoothening the flow of powder discharged from the metering hopper, said smoothening means including a trough beneath the metering hopper and a vibration generator for vibrating the trough, said trough having a discharge and located downstream of the metering hopper, said vibration generator being operable to smoothen the flow of powder while it is transferred through the trough to the discharge end;

said control means comprising timer means for measuring time and user-adjustable means for setting a time period to be measured by the timer means; said control means producing a discharge signal when the time period measured by the timer means elapses to bring the hopper opening-closing means to its opening position so that the intervals of powder discharge can be increased by increasing the time period set in the timer means or decreased by decreasing the time period set in the timer means;

weight detecting means for detecting the weight of powder contained within the metering hopper, said weight detecting means being variable to control the amount of powder fed by the metering hopper so that the amount of powder fed by the metering hopper is controlled by both said timer means and said weight detecting means;

said powder feeding apparatus further comprising driving means for feeding powder into said metering hopper, and wherein said hopper opening-closing means includes a top shutter and a bottom shutter, and wherein said control means includes means for signalling for the activation of said driving means and signalling for said hopper opening-closing means to position said top shutter in an open position and said bottom shutter in a closed position, said control means further including means for signalling the deactivation of said driving means and the closing of said top shutter upon said weightdetecting means detecting a predetermined weight of powder in said hopper, and said control means further including means for signalling for the opening of said bottom shutter when said period measured by said timer means has elapsed.

2. The powder feeding apparatus of claim 1 wherein the width of the trough decreases progressively as it extends more toward the downstream side of the powder transferring direction.

3. The powder feeding apparatus of claim 2 wherein the trough has a bottom wall extending in the powder transferring direction and two side walls provided in the bottom wall, one side wall extends substantially parallel to the powder transferring direction and the other side wall extends toward the downstream side of the powder transferring direction while being inclined inwardly.

4. The powder feeding apparatus of claim 1 wherein the trough is provided with forced smoothening means for acting on the powder and smoothening it.

5. The powder feeding apparatus of claim 4 wherein the forced smoothening means is comprised of a plurality of smoothening members disposed pivotally in spaced-apart relationship in the powder transferring direction, and the smoothening members approach the bottom surface of the trough to a greater extent as they extend more toward the downstream side of the powder transferring direction.

6. The powder feeding apparatus as recited in claim 1, wherein said timer means starts timing when said driving means is activated.

* * * * *